US005379880A

United States Patent [19]

Stone et al.

[11] Patent Number: 5,379,880

[45] Date of Patent: Jan. 10, 1995

[54] METHOD AND APPARATUS FOR ELECTROSTATIC COATING OF ARTICLES

[75] Inventors: James W. Stone, Northbrook; Frederick A. Kish, Wheeling; John Wojcik, Long Grove; Donald L. Van Erden, Wildwood; David E. Fredericksen, Hoffman Estates; Parimal M. Vadhar, Buffalo Grove, all of Ill.

[73] Assignee: Illinois Tool Works Inc., Glenview, Ill.

[21] Appl. No.: 18,144

[22] Filed: Feb. 16, 1993

[51] Int. Cl.$^{6}$ .............................................. B65G 41/24

[52] U.S. Cl. .................................... 198/396; 198/389; 198/679

[58] Field of Search ............... 198/389, 391, 396, 679, 198/803.6, 472.1

[56] References Cited

U.S. PATENT DOCUMENTS

| | | | |
|---|---|---|---|
| 2,862,601 | 12/1958 | Littwin et al. | 198/472.1 |
| 3,054,170 | 9/1962 | Benichasa et al. | 198/389 X |
| 3,317,702 | 5/1967 | Mann | 198/803.6 X |
| 3,430,752 | 3/1969 | Spodig | 198/472.1 |
| 3,565,234 | 2/1971 | Birdsong | 198/396 X |
| 3,637,065 | 1/1972 | Ruscitti | 198/472.1 |
| 3,831,736 | 8/1974 | Barnes | 198/803.6 |
| 3,884,347 | 5/1975 | Gallagher et al. | 198/389 X |
| 4,120,993 | 10/1978 | Duffy et al. | 427/195 |
| 4,462,508 | 7/1984 | Grafius | 198/396 X |
| 4,490,922 | 1/1985 | Gorodetsky et al. | 198/679 X |
| 4,656,051 | 4/1987 | Wojcik | 427/33 |
| 4,842,890 | 6/1989 | Sessa et al. | 427/47 |
| 5,025,750 | 6/1991 | Sessa et al. | 118/69 |
| 5,078,083 | 1/1992 | DiMaio et al. | 118/308 |

FOREIGN PATENT DOCUMENTS

| | | | |
|---|---|---|---|
| 46-36816 | 10/1971 | Japan | 198/472.1 |
| 0061512 | 5/1980 | Japan | 198/389 |
| 4-159914 | 6/1992 | Japan | 198/391 |

*Primary Examiner*—James R. Bidwell

*Attorney, Agent, or Firm*—Dressler, Goldsmith, Shore & Milnamow

[57] ABSTRACT

A continuous, automated method and apparatus for transporting and electrostatically coating articles including providing a plurality of articles in an unoriented bulk state, each article having a first end portion, orienting each article and transporting them into a desired position, transferring each article in succession to a moving conveyor, suspending each article from the conveyor by its end portion and conveying the articles for electrostatic coating and curing.

4 Claims, 3 Drawing Sheets

Fig. 3
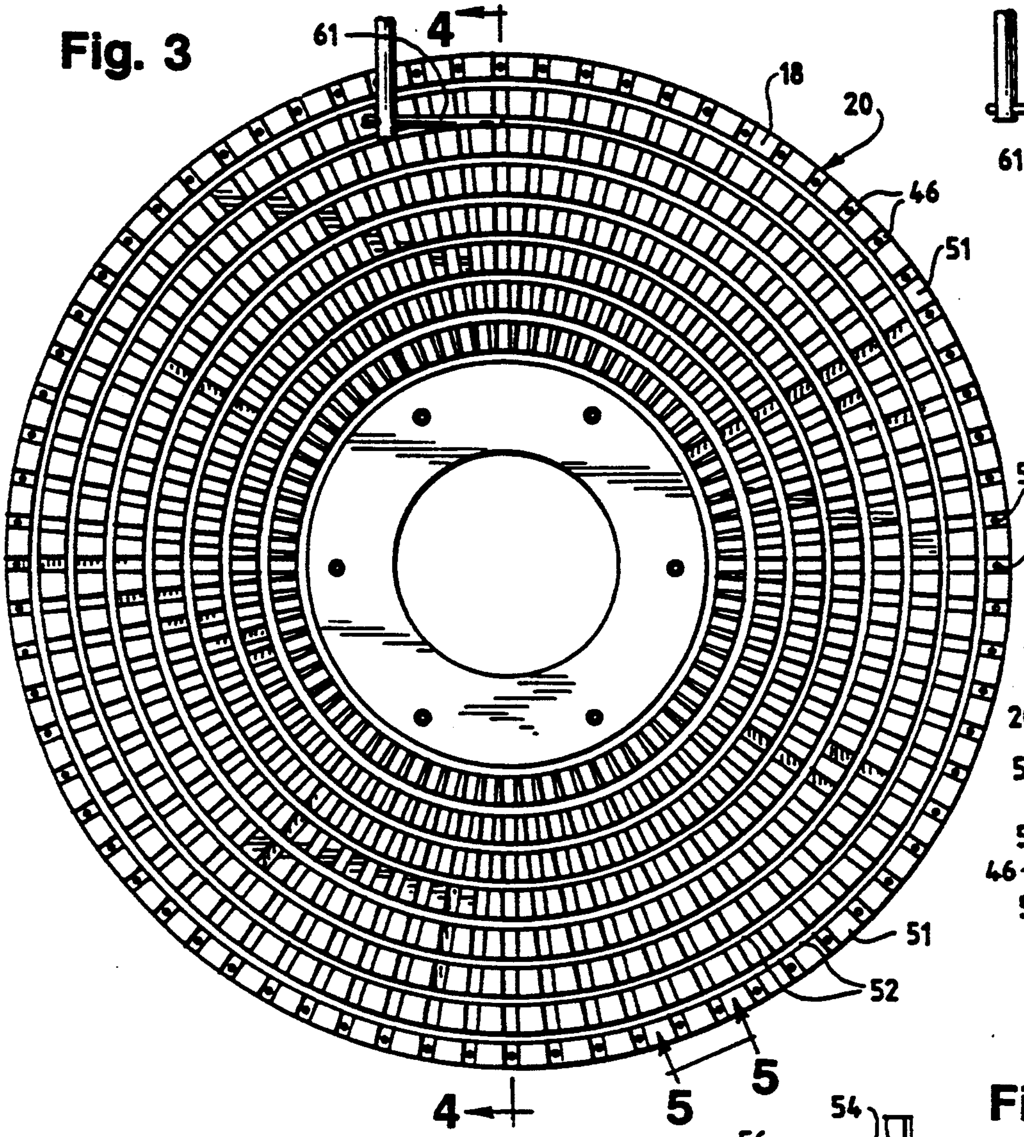
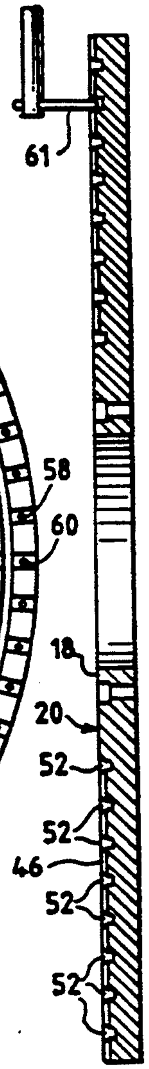
Fig. 4
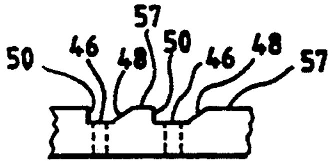
Fig. 5
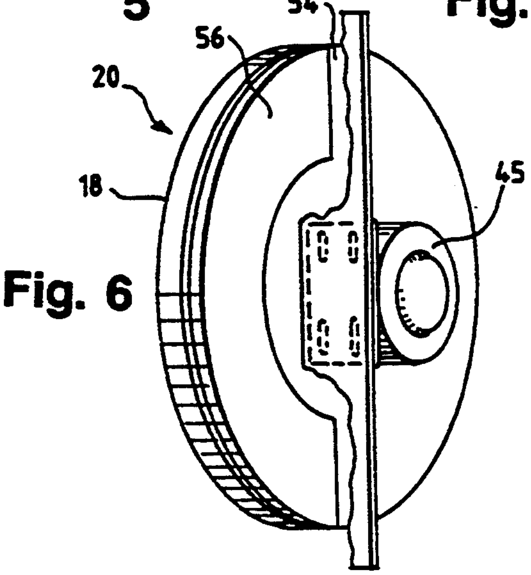
Fig. 6

Fig. 7
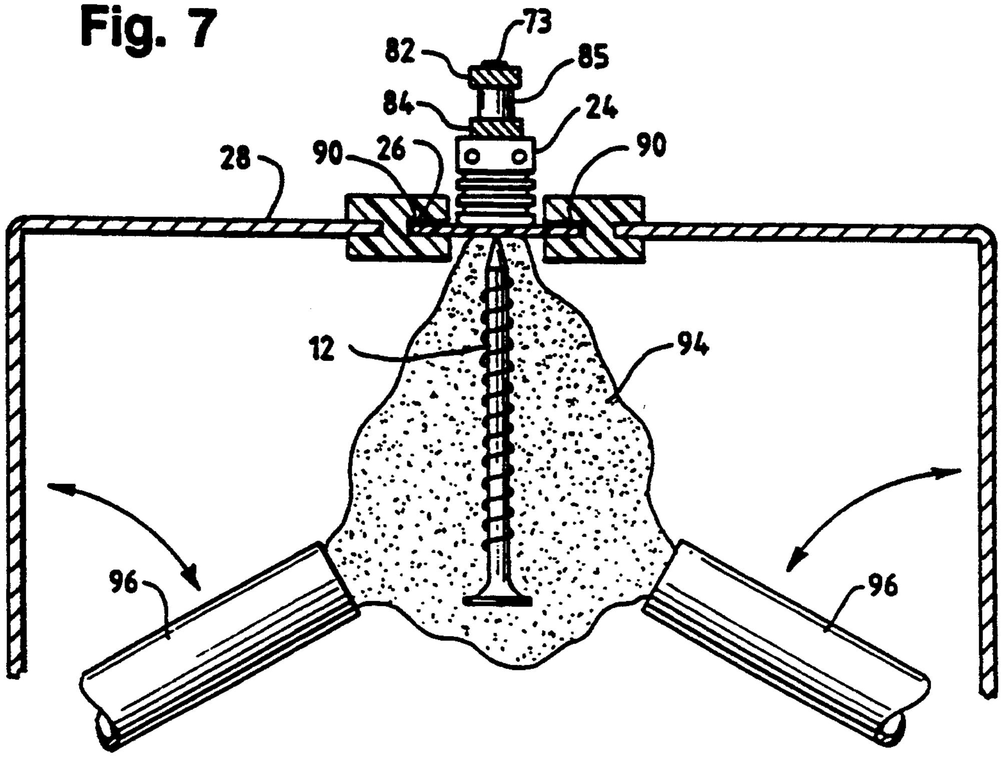
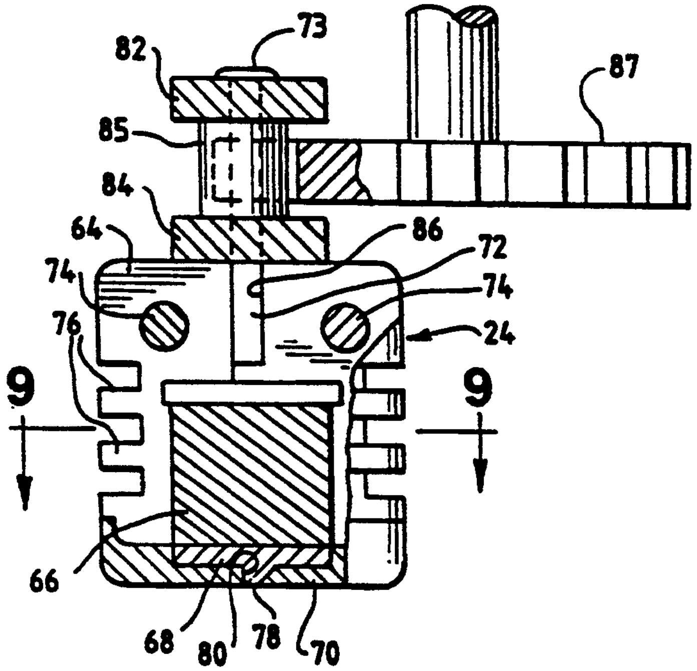
Fig. 8
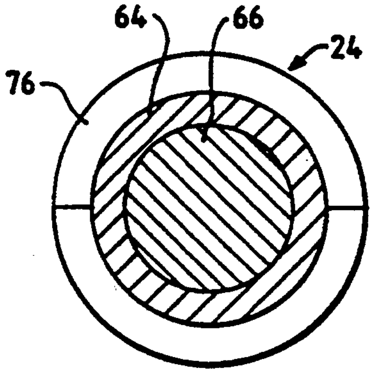
Fig. 9

METHOD AND APPARATUS FOR ELECTROSTATIC COATING OF ARTICLES

BACKGROUND OF THE INVENTION

1. Field of the Invention

This invention relates generally to powder coating of articles by an electrostatic process, and more particularly to a continuous, automated method and apparatus for massproducing electrostatically coated fasteners, such as screws or the like, where substantially the entire exterior surface of the fastener is provided with uniform coverage of the coating.

2. Description of the Related Art

Coating of articles or components frequently is desirable to provide a protective layer of material on the exterior surfaces of the components for a variety of reasons, including protecting against corrosion. In order to provide such a coating, however, a portion of the component typically remains uncoated.

For example, coating of components can be provided in a batch process by what is known as a "dip and spin" method. With this method a plurality of components are dipped or mixed within a vessel containing the desired coating. Upon removal, the components tend to stick or adhere together, and, when spun and dried, must be separated leaving uncoated portions on the components where they previously were adhered.

Alternatively, a component can be held by a mechanism while the coating is applied. Upon release, however, the portion of the component held by the mechanism remains uncoated.

Uncoated portions on components particularly are a problem with coating fasteners such as screws, nails, rivets or the like. Such fasteners are difficult to hold due to their shapes and typically require coating on their entire exterior surfaces.

Fasteners are either batch processed or held as described above and usually have undesirable uncoated portions thereon. If such fasteners are to be held while the coating is applied, they frequently are held by their heads which does not receive a layer of coating. Uncoated fastener heads are not desirable since in use the heads frequently are exposed to the elements.

An example of a coating apparatus which holds or contacts the heads of fasteners is illustrated in U.S. Pat. No. 5,025,750. That patent discloses a method and apparatus for coating a fastener having a head portion and a shank portion where the fasteners are supported on their head portions, are heated to a desired temperature and the protective coating is applied only to the shank portion of the fastener.

Fasteners or other components also can be coated using an electrostatic process where powder particles are electrostatically charged as they exit a spray gun to form a particle cloud or ion field through which an electrically grounded fastener is passed. The charged powder particles stick to the exposed surfaces of the grounded fastener which then is removed from the cloud for curing and/or further processing.

To electrostatically coat fasteners or other components, at least a portion of the fastener must be held as it is conveyed through the cloud of charged particles. Consequently, the portion of the fastener held, which typically is the head of the fastener, does not get covered with the protective coating.

It therefore is desirable to provide a continuous, automated method and apparatus for coating a fastener or other article with a protective coating, such as by an electrostatic process or other method, where the fastener is held by a conveying mechanism which merely is in contact with a minute portion of the exterior surface of the fastener, such as a tip or point thereof, to enable coating of substantially the entire exterior periphery of the fastener and which can be utilized in mass production.

SUMMARY OF THE INVENTION

The invention provides a continuous, automated method and apparatus for transporting and electrostatically coating articles such as fasteners. A plurality of articles are provided in an unoriented bulk state, each article having a first end portion. The articles are oriented and transported into a desired position and transferred in succession to a moving conveyor where each article is suspended from the conveyor by its end portion and is conveyed for electrostatic coating and curing.

BRIEF DESCRIPTION OF THE DRAWINGS

FIG. 3 is a front elevational view of the feed wheel of the invention;

FIG. 4 is a cross-sectional view of the feed wheel of the invention taken along line 4—4 of FIG. 3 and in the direction indicated generally;

FIG. 5 is a bottom plan view of a portion of the feed wheel taken along line 5—5 of FIG. 3 and in the direction indicated generally;

FIG. 6 is a perspective view of the rear side of the feed wheel of FIG. 3;

FIG. 7 is a cross-sectional view of the coating booth of the process of FIG. 1 illustrating a fastener being electrostatically coated;

FIG. 8 is a side elevational view in partial section of a magnet assembly of the invention; and FIG. 9 is a cross-sectional view of the magnet assembly of the invention taken along line 9—9 of FIG. 8 and in the direction indicated generally.

DESCRIPTION OF THE PREFERRED EMBODIMENTS

Figure 1:
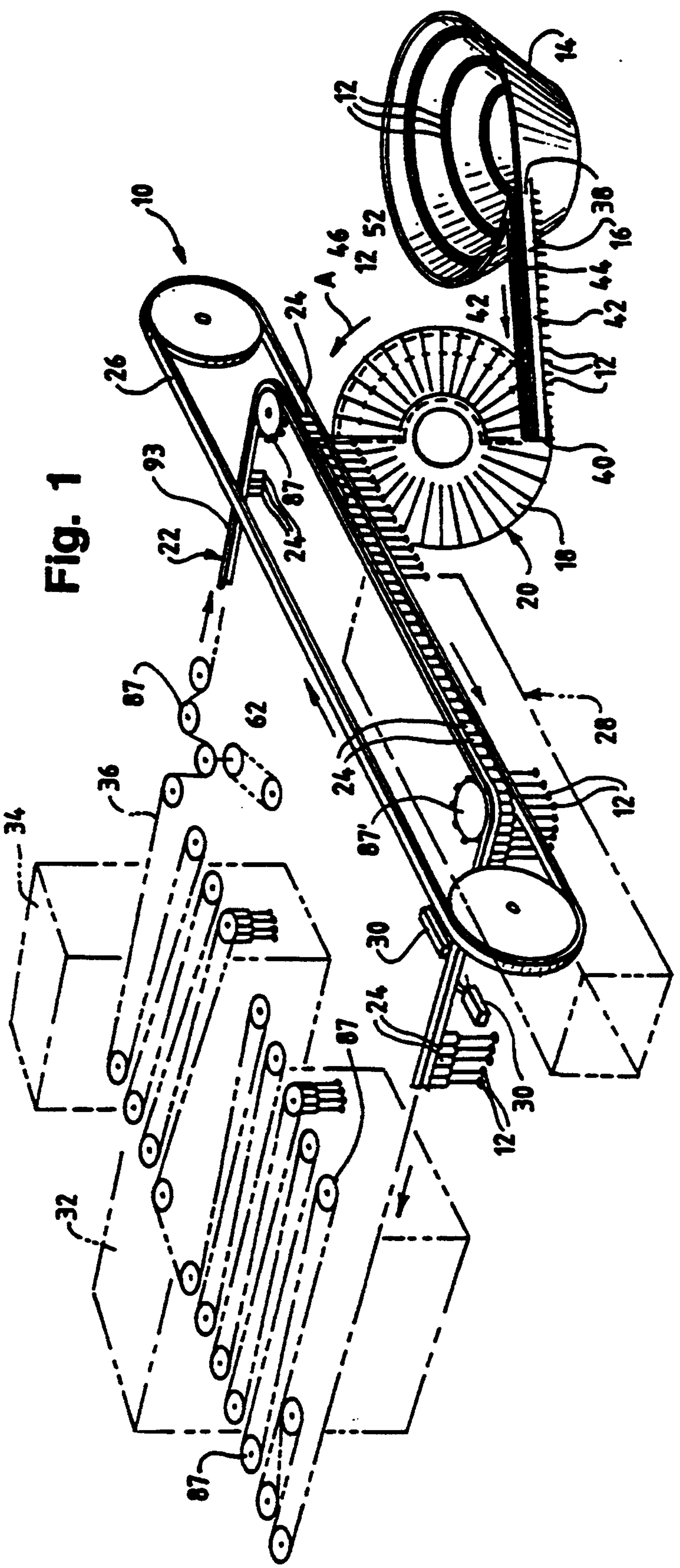
FIG. 1 is a perspective view of the overall method and apparatus of the invention.

Referring to FIG. 1, the apparatus utilized to perform the method of the invention is designated generally by the reference numeral 10. The method substantially includes the following steps.

Bulk fasteners 12 initially are loaded into a vibratory bowl 14. The bowl 14 then orients and aligns the fasteners 12 and feeds them into a chute 16 where they are arranged in a line one behind the other.

Next, each fastener 12 in succession is fed by gravity from the chute 16 to a position proximate a front face 18 of a continuously rotating feed wheel or disc 20. Due to the structure and magnetic attraction of the feed wheel 20 as described hereinafter, the fasteners 12 are removed from the chute 16, magnetically attracted and adhered, one-by-one, to the front face 18 and transported through an arc of approximately 180 degrees in the direction of arrow "A".

Each fastener 12 then is transferred in succession from the front face 18 of the feed wheel 20 onto a continuously moving conveyor assembly 22 comprising a conventional chain and sprocket drive. The conveyor assembly 22 includes a plurality of magnet assemblies 24 suspended from the chain, one each for alignment and holding of a tapered tip or point of a respective fastener 12, and an endless shield or belt 26 which is positioned between each fastener 12 and a respective magnet assembly 24 for reasons to be explained hereinbelow.

Next, each fastener 12 is conveyed, suspended by its tip, by its respective magnet assembly 24 with the shield 26 therebetween into a coating or paint booth 28 where the fastener 12 preferably is provided with an electrostatically applied coating of material. Just prior to leaving the coating booth 28 the shield 26 is removed from between each fastener 12 and magnet assembly 24 causing each fastener 12 to be suspended directly from its respective magnet assembly 24. As each fastener 12 exits the coating booth 28 proximate the position where the shield 26 is removed, air guns 30 blow off any excess coating from the fasteners 12 and/or magnet assemblies 24, preferably back into the coating booth 28.

Figure 2:
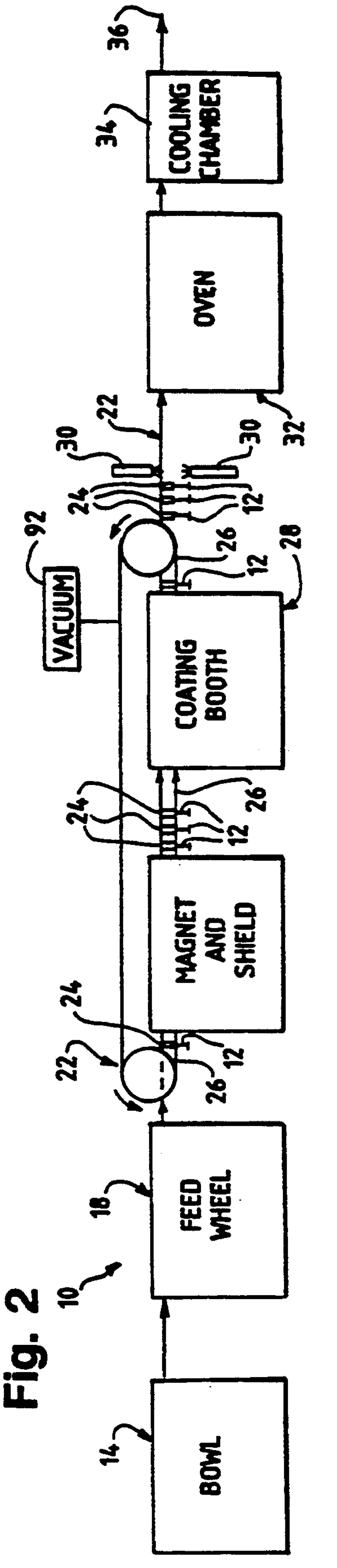
FIG. 2 is a schematic diagram of the method of FIG. 1.

Finally, the fasteners 12 are conveyed into a curing oven 32 and then a cooling chamber 34 and are removed from the conveyor assembly 22 at a desired position, such as at offload point 36, for example. FIG. 2 provides a schematic illustration of the above process.

Fasteners 12 coated according to this process are completely coated except for a minute portion of the tapered tip or point of each fastener which is in contact with the magnet assembly 24. The lack of coating at the tip is irrelevant for most applications.

Additionally, the fasteners 12 can be suspended by an edge or other surface if desired. Fasteners 12 having a length between 1 inch and 8 inches successfully have been processed utilizing the method and apparatus 10 of the present invention up to speeds of 360 fasteners per minute. Smaller or longer fasteners, however, similarly can be processed and at faster or slower speeds.

Details of the structure of the apparatus 10 utilized for carrying out the above process now will he provided.

As FIG. 1 illustrates, the fasteners 12 are fed in batch form into a vibratory bowl 14. By continued vibration, the bowl 14 orients and arranges the fasteners 12 one behind the other with their tips pointing downward and conveys them into a first end 38 of the chute 16.

The fasteners 12 are aligned along the length of the chute 16 which terminates in a second opposite end 40 positioned proximate the front face 18 of the feed wheel 20. The second end 40 of the chute 16 preferably is positioned at a ninety degree angle with respect to the plane of the front face 18, is adjustable in both a vertical and horizontal direction to feed fasteners 12 of different sizes and substantially is formed by two elongate bars 42 having a channel 44 therebetween for accepting the shanks of the fasteners 12 therein and holding the fasteners 12 by their heads. It is to be understood that the particular apparatus utilized to arrange and convey the fasteners 12 from a bulk state to a position proximate the front face 18 of the feed wheel 20 can vary.

The fasteners 12 are advanced down the chute 16 by gravity. Preferably, in order to prevent the fasteners 12 from falling out of the second end 40 of the chute 16, the front face 18 of the feed wheel 20 is positioned in such close proximity to the second end 40 that the fasteners 12 cannot fall therebetween. This spacing of the front face 18 from the chute 16, combined with the structure and speed of the feed wheel 20 and the fall of the fasteners 12 within the chute 16 is selected to enable uninterrupted feeding of the fasteners 12 to the feed wheel 20 as described herein.

The feed wheel 20 rotates in the direction of arrow "A" and accepts each fastener 12 individually thereon for transport and transfer to the conveyor assembly 22. The feed wheel 20 preferably is formed from a nonmagnetic material and driven by a motor 45 (FIG. 6) whose speed can be adjusted as necessary to be synchronous with movement of the conveyor 22.

As FIG. 1 illustrates, the fasteners 12 are engaged to the front face 18 at the bottom of the feed wheel 20 and are conveyed substantially within an arc of 180 degrees to the top of the feed wheel 20 where they are transferred to the conveyor 22. When conveyed, the fasteners 12 are held on the front face 18 of the feed wheel 20 with their tips extending slightly outside the periphery of the feed wheel 20.

As FIG. 3 illustrates, to seat the shanks of the fasteners 12 against the front face 18 of the feed wheel 20, the front face 18 includes a plurality of radial slots 46 spaced thereabout and positioned at a distance from each other, one slot 46 for a respective fastener 12. As FIG. 5 illustrates, the slots 46 include a first tapered entry and exit surface 48 and a second surface 50 substantially perpendicular to the face 18.

To seat the heads of the fasteners 12 against the front face 18 of the feed wheel 20, as illustrated in FIG. 1, the front face 18 includes a plurality of concentric circular grooves 52 thereon, positioned at a distance from each other and intersecting the radial slots 46. As FIG. 4 illustrates, the grooves 52 extend further into the front face 18 to accommodate the heads of the fasteners 12 with the shanks seated flat against the radial slots 46.

It is to be noted that the radial slots 46 are of a predetermined width and depth so that they can accept a variety of fasteners 12 of different shank diameters. Similarly, the grooves 52 are of a desired width and depth to accommodate a variety of head sizes and are positioned at various distances to accommodate fasteners 12 of differing lengths. Although only eight grooves 52 are illustrated, which are positioned to correspond to the more common fastener lengths, both the number and position of the grooves 52, as well as the radial slots 46, can vary to accept a fastener 12 of virtually any size and length.

As FIG. 6 illustrates, in order to hold the fasteners 12 to the front face 18 of the feed wheel 20 a back side 54 of the feed wheel 20 preferably includes a semicircular permanent magnet 56 positioned at a slight distance from the back side 54 behind the radial slots 46 and grooves 52. The magnet 56 does not interfere with the rotation of the feed wheel 20 and extends substantially along an arc of 180 degrees behind the front face 18 from the bottom to the top of the feed wheel 20.

The magnet 56 provides a magnetic force through the feed wheel 20 from the backside 54 which magnetically holds the ferromagnetic fasteners 12 on the front face 18. Due to the reduced thickness of the feed wheel 20 in the areas of the slots 46 and grooves 52, the magnetic force will be slightly greater in these areas.

The chute 16 and feed wheel 20 are adjustable to ensure that as the fasteners 12 advance to the second end 40 of the chute 16 the heads of the fasteners 12 are aligned with a predetermined groove 52 selected to ensure that the tip of the particular size fastener 12 utilized extends slightly beyond the outer periphery of the feel wheel 20. When a fastener 12 reaches the second end 40 of the chute 16, the head enters the designated groove 52 while the feed wheel 20 continues to rotate.

The shank of the fastener 12 will slide or spin along flats 57 between the slots 46 and descend down the entry/exit surface 48 into the slot 46. The perpendicular surface 50 of the slot 46 then engages the shank and, combined with the force of the magnet 56, removes one fastener 12 at a time from the chute 16.

To enhance the magnetic force of the magnet 56 and assist in holding a fastener 12 within a desired radial slot 46, the outer end of each radial slot 46 can include a throughbore 58. This increases and concentrates a portion of the magnetic force at each throughbore 58 and is particularly effective to assist in holding and stabilizing relatively small fasteners 12. To further increase the magnetic force at each throughbore 58, a rod 60 of ferromagnetic material can be inserted and retained within each throughbore to act as a pole piece for directing the magnetic flux.

The feed wheel 20 and associated magnet 56 can be adjusted within any plane to provide proper feeding and alignment of the fasteners 12 from the chute 16 to the feed wheel 20 and in turn to the conveyor assembly 22. Additionally, the magnet 56 provides magnetic holding of fasteners 12 only from the bottom to the top of the feed wheel 20. At the top of the feed wheel 20 the fasteners 12 no longer are magnetically held and are propelled by the feed wheel 20 into engagement with the magnet assemblies 24 of the conveyor assembly 22. If desired, the magnet 56 can be an electromagnet.

To assist in removing the fasteners 12 from the feed wheel 20 and transfer them to the conveyor assembly 22, a pick or probe 61 is provided proximate the top of the feed wheel 20 proximate the end of the magnet 56. The pick 61 is adjustable to be disposed within but not contacting a preselected one of the annular grooves 52 to engage successive fasteners in the radial slots 46 and guide the fasteners along the exit surfaces 48 out of the slots 46 onto the magnets 24 of the conveyor assembly 22.

As FIG. 1 illustrates, the conveyor assembly 22 substantially is formed in an endless loop and is driven by a synchronized drive system 62. The particular type of drive system 62 as well as the conveyor assembly 22 can vary.

Preferably, the conveyor assembly 22 is a chain driven type of conveyor which runs through a support channel having the magnet assemblies 24 connected to the chain. The speed of the conveyor assembly 22 can be adjusted as desired.

Each magnet assembly 24, as illustrated in FIG. 8, preferably includes an outer housing 64, a permanent magnet 66, a pin 68, a cap 70 and is connected to the conveyor by a support stem 72. The housing 64 is generally cylindrical but having a diametrically split upper portion connected by fasteners 74. The housing 64 is formed from aluminum due to aluminum's light weight, nonmagnetic, corrosion resistant and thermally conductive properties. To assist in heat dissipation within the magnet assemblies 24 after exiting the oven 32, the exterior of the housing 64 includes a plurality of venting or cooling ribs 76. The permanent magnets 66 can be electromagnets so long as they function and can be conveyed as described herein.

The cap 70 is formed from nonmagnetic aluminum while the pin 68 is made of a ferromagnetic material and includes a tip 78 which extends through a tapered aperture 80 formed through the center of the arcuate can 70. Thus, the pin 68 acts as a magnetic field concentrator which focuses the magnetic field of the magnet 66 substantially in the center of the cap 70 primarily on the tip 78.

The particular design of the magnet assembly 24 to include the pin 68 and cap 70 enables the magnet assembly 24 to magnetically hold virtually any size fastener 12, including those fasteners 12 of a relatively short length. Without the pin 68 the magnet 66 would act over a larger surface area and tend to attract the shank of the fastener 12. Such attraction tends to wobble the fastener 12 as it is conveyed and frequently rotates the fastener 12 about its tip so that it is suspended horizontally from the magnet assembly 24 along the shank rather then vertically by the tip of the fastener 12 as desired.

The details of the connection of the magnet assemblies 24 to the endless chain of the conveyor assembly 22 are shown generally in FIG. 7 and more specifically in FIG. 8. The chain includes a plurality of upper and lower links 82 and 84 and tubular sleeves 85 disposed between the links at spaced intervals conventionally arranged for engagement by the various sprockets 87 of the conveyor assembly. The support stem 72 of each magnet assembly is press-fit into an opening 86 in the magnet housing 64 and extends upwardly through the chain links 82 and 84 and sleeve 85. The top 73 of the stem 72 is swaged into holding engagement with the chain assembly.

To assemble the magnet assemblies 24, the upper split portion of housing 64 is secured together by the fasteners 74. Next, the support stem 72 and then the permanent magnet 66 are inserted within the housing 64. The pin 68 is connected to the cap 70, such as with a high temperature adhesive, and then the cap 70 and pin 68 are connected to the housing 64 by magnetic attraction of magnet 66.

As FIG. 7 illustrates, the lower run of the shield 26 is positioned between the tip of each of the fasteners 12 and the magnet assemblies 24. Preferably, the shield 26 is made from an electrically conductive but nonmagnetic material. Electrical grounding of the fastener 12 is provided through the shield 26, magnet assemblies 24 and the conveyor assembly 22 to enable the desired electrostatic coating.

Additionally, the shield 26 protects the magnet assemblies 24 from being coated with material in the coating booth 28. To further assist in preventing material from coating the magnet assemblies 24, the shield 26 is conveyed through sealing slots 90 formed with the coating booth 28.

As FIGS. 1 and 2 illustrate, the shield 26 is formed as an endless belt or loop, is conveyed by the magnetic force of the magnet assemblies 24 and is positioned between the fasteners 12 and magnet assemblies 24 only as they are conveyed from the feed wheel 20 to and through the coating booth 28. After the fasteners have been coated, the conveyor assembly 22 changes the direction of movement of the fasteners ninety degrees about the sprocket 87'. The magnets pull the respective fasteners across the surface of the shield 26 into direct engagement with the magnets.

If any coating exists on the surface of the shield 26 the tip of the fastener 12 scrapes it off and transfers it to the magnet assembly 24. The air guns 30 can be directed at the tips of the fasteners 12 as they jump to the magnet assemblies 24 and remove the material scraped off the shield 26.

Additionally, since the coating on the fasteners 12 is not yet cured, the air guns 30 can be directed to remove coating from the shank, a portion of the shank or the head of each fastener, if desired, and positioned at a slight angle toward the coating booth 28. This slight angle, combined with the venting suction provided within the coating booth 28 forces the excess coating back into the coating booth 28 where it can be combined with the excess powder coating within the coating booth 28 for recycling.

As FIG. 2 illustrates, to keep the shield 26 clean, a vacuum 92 can be positioned outside the coating booth 28 at a position after transfer of the fasteners 12. The vacuum 92 can be connected to return the excess powder coating for recycling.

Additionally, to clean the magnet assemblies 24 after curing and removal of the fasteners 12, a cleaning mechanism 93 can be positioned after the off-load point 36 but before the feed wheel 20. Preferably, the cleaning mechanism 93 includes one or more brushes, but can vary.

In operation, a plurality of fasteners 12 are dumped in a batch or continuously fed into the vibratory bowl 14 in a completely random, unoriented state. The vibratory bowl 14 orients, aligns and conveys each fastener 12, one behind the other, into the chute 16.

The chute 16 in turn feeds each fastener 12 one-by-one to a respective radial slot 46 on the front face 18 of the rotating feed wheel 20. The chute 16 and feed wheel 20 are adjusted so that the head of the particular size fastener 12 being processed seats within a desired circumferential groove 52 with the tip of the fastener 12 extending slightly beyond the periphery of the feed wheel 20.

The feed wheel 20 conveys each fastener 12 in an arc of 180 degrees to be suspended by its tip from a respective magnet assembly 24 with the shield 26 therebetween. The fasteners 12 and shield 26 are pulled by the magnet assemblies 24 into the coating booth 28 through a cloud of charged powder coating 94 provided by nozzles 96, which can be adjusted as desired.

Just prior to leaving the coating booth 28, the fasteners 12 are conveyed perpendicular to the shield 26 to be suspended directly from each magnet assembly 24. The air guns 30 blow any excess or undesired coating back into the coating booth 28 and the fasteners 12 and magnet assemblies 24 proceed into the oven 32 and cooling chamber 34 and are offloaded at 36, either in an oriented or unoriented manner.

Modifications and variations of the present invention are possible in light of the above teachings. It therefore is to be understood that within the scope of the appended claims the invention may be practiced other than as specifically described.

What is claimed and desired to be secured by letters patent is:

1. A continuous automated method of transporting articles from unoriented bulk to an oriented state for processing, comprising the steps of:

providing a plurality of articles in an unoriented bulk state, each article having an end portion which substantially forms a point on said article;

orienting and transporting each of said articles into a desired position;

transferring each of said articles in succession from said desired position to a moving conveyor;

suspending each of said articles on said conveyor from said point of said end portion;

shielding each article from direct contact with said conveyor with endless belt means for shielding; and conveying said articles for processing.

2. The method as defined in claim 1 wherein said articles are composed of a ferromagnetic material and said step of suspending includes magnetically holding each article by said end portion.

3. The method as defined in claim 1 wherein said step of transferring includes transferring and magnetically holding each of said articles in succession on a respective portion of a continuously rotating feed wheel.

4. The method as defined in claim 1 including electrically grounding each article during conveying.

* * * * *